(12) United States Patent
Davies et al.

(10) Patent No.: US 6,576,211 B1
(45) Date of Patent: Jun. 10, 2003

(54) CRYSTAL-CONTAINING MATERIAL

(76) Inventors: Geoffrey John Davies, 36 Boundary Road, Linden Extension, 2194 Randburg (ZA); Raymond Albert Chapman, 183 Columbine Avenue, Mondeor, 2091, Johannesburg (ZA); Aulette Stewart, 22 Nicolyn Avenue, Ruiterhof, 2194, Randburg (ZA); Lesley Kay Hedges, 4 Oriole Mews, Delphinium Street, Brackenhurst, 1448 (ZA); Moosa Mahomed Adia, 8 Nagel Street, Lakefield, 1501, Benoni (ZA)

(*) Notice: Subject to any disclaimer, the term of this patent is extended or adjusted under 35 U.S.C. 154(b) by 0 days.

(21) Appl. No.: 09/555,528

(22) PCT Filed: Dec. 10, 1998

(86) PCT No.: PCT/GB98/03696
§ 371 (c)(1),
(2), (4) Date: Aug. 4, 2000

(87) PCT Pub. No.: WO99/29412
PCT Pub. Date: Jun. 17, 1999

(30) Foreign Application Priority Data

Dec. 11, 1997 (ZA) .............................. 97/11150

(51) Int. Cl.$^7$ ............... C01B 31/06; C30B 11/00; C30B 17/00
(52) U.S. Cl. .......................... 423/446; 117/79
(58) Field of Search ............... 423/446; 117/79

(56) References Cited

U.S. PATENT DOCUMENTS

| | | | | | |
|---|---|---|---|---|---|
| 4,551,316 | A | * | 11/1985 | Iizuka | 423/290 |
| 5,151,107 | A | * | 9/1992 | Cho et al. | 51/295 |
| 6,270,548 | B1 | * | 8/2001 | Campbell et al. | 75/243 |

FOREIGN PATENT DOCUMENTS

EP    0079117    * 5/1983 ........... C01B/31/06
EP    0699642 A2  * 3/1996 ........... C04B/35/5835

OTHER PUBLICATIONS

Hongchang Yu et al. "Sintering of Ultrafine Diamond Particles Under High Temperature and High Pressure", Diamond and Related Materials, vol. 3, No. 3 Feb. 1, 1994, pp. 222–226.*

Shi Ming Hong et al. "Diamond Formation from a System of SiC and a Metal", Diamond and Related Materials., vol. 2, 1993, pp. 508–511.*

Jae–Kap Lee et al. "Effect of the Buoyancy Force on Diamond Formation During Synthesis Under a High Pressure", vol. 2, Mar. 31, 1993, pp. 496–499.*

A.V. Andreyev et al. "Diamond Formation and Wettability in a Mg–Cu–C System Under High Pressure and High Temperature", vol. 6, No. 1, Jan. 1997, pp. 28–32.*

* cited by examiner

Primary Examiner—Wayne A. Langel
Assistant Examiner—Jonas N. Strickland
(74) Attorney, Agent, or Firm—Oblon, Spivak, McClelland, Maier & Neustadt, P.C.

(57) ABSTRACT

A method of making a bonded, coherent material comprising a mass of crystals, preferably diamond crystals, in a matrix is provided. The steps include providing a source of the crystals of the type to be grown and which are substantially free of macroscopically faceted surfaces, producing a reaction mass by bringing the source crystals into contact with a suitable solvent/catalyst, subjecting the reaction mass to conditions of elevated temperature and pressure suitable for crystal growth in the reaction zone of a high temperature/high pressure apparatus to produce the material and removing the material from the reaction zone, the conditions of crystal growth being chosen such that the source crystals are converted to crystals having developed macroscopic facets of low Miller index. Preferably the conditions of elevated temperature and pressure used are such that the Wulff effect dominates.

17 Claims, 3 Drawing Sheets

CRYSTAL-CONTAINING MATERIAL

BACKGROUND OF THE INVENTION

This invention relates to a crystal containing material.

The manufacture of diamond matrix composites or tool materials or components, such as saw segments, grinding wheels and polycrystalline diamond (PCD) products, is well established. There are various methods used in their manufacture. For saw segments, pellets, pearls and the like, diamond powder is mixed with matrix material and the mixture sintered, substantially at atmospheric pressure, to produce the component. Alternatively, the molten matrix material is infiltrated into a bed of the diamond powder, also substantially at atmospheric pressure, to produce the component. For PCD products, diamond powder is sintered under conditions of high temperature and high pressure in the presence of a solvent-catalyst, and the resultant piece shaped afterwards to produce the final component.

In essence, each method and product starts with diamond powder and then the component is fabricated. Some of these methods are conducted at substantially atmospheric pressure, and components produced by them, are restricted to matrices that sinter or infiltrate at relatively low temperature so that graphitisation of the diamond is avoided or minimised.

In the manufacture of PCD products, the solvent-catalyst is restricted usually to the matrices used for the production of the cemented tungsten carbide support, or in the case of the more thermally stable products, the infiltrant is restricted to those elements or compounds which react with the diamond to form a desirable phase, e.g. silicon forming silicon carbide.

SUMMARY OF THE INVENTION

According to the present invention, a method of making a bonded, coherent material comprising a mass of crystals in a matrix includes the steps of providing a source of the crystals of the type to be grown and which are substantially free of macroscopically faceted surfaces, producing a reaction mass by bringing the source crystals into contact with a suitable solvent/catalyst, subjecting the reaction mass to conditions of elevated temperature and pressure suitable for crystal growth in the reaction zone of a high temperature/high pressure apparatus to produce the material and removing the material from the reaction zone, the conditions of crystal growth being chosen such that the source crystals are converted to crystals having developed macroscopic facets of low Miller index.

Particles with a high proportion of high Miller index surfaces will yield faceted crystals more readily than particles with a low proportion of high Miller index faces. Further, particles with a low proportion of high Miller index surfaces may only facet partially and/or show dissolution facets. The bonded, coherent material will contain crystals in which a high proportion, generally at least 50% and preferably at least 70% of which, have developed facets of low Miller index. These crystals, particularly if they are diamond crystals, will generally be single crystals.

The method of generating the supersaturation driving force necessary for crystal growth used in the practice of this invention depends, at least in part, and preferably predominantly, upon the difference in surface free energy between low Miller index surfaces and higher Miller index surfaces which is hereinafter referred to as "the Wulff effect"; higher Miller index surfaces having a higher surface free energy than lower Miller index surfaces. The equilibrium shape of a crystal occurs when the minimum total surface free energy per unit volume of crystal is attained, i.e. when the crystal is bounded by surfaces of low Miller index. Higher Miller index surfaces can be considered to comprise a series of stepped low Miller index surfaces in close proximity to one another. Such a situation is included in the term "higher Miller index surface". When a crystal is in its equilibrium shape, there exists a point whose perpendicular distance from every face is proportional to the surface free energy of that face. This is the basis of Wulff's theorem.

It has been found that in the case of diamond, the preferred crystal in the practice of the invention, the difference in surface-free energy between high Miller index surfaces and low Miller index surfaces is large and can generate a supersaturation which sustains crystallisation when diamond crystals in various sizes, including those tens of microns in size, are used. Thus, the invention has particular application to the growth of diamond crystals wherein supersaturation is created, at least in part, and preferably predominantly, by a difference of solubility in crystal surfaces of high Miller index and crystal surfaces of lower Miller index, e.g. by the reduction of surface free energy by the substantial elimination of steps, kinks and other structural defects which characterise macroscopic high Miller index surfaces.

It has further been observed that the Wulff effect is dependent on the conditions which prevail in the reaction mass. For example, for a given solvent/catalyst and pressure applied, the Wulff effect is dependent on temperature and time, as can be seen from the graphs shown in FIGS. 1 and 2. The graph of FIG. 1 shows the temperature dependence of the Wulff effect on diamond in an iron-nickel solvent/catalyst at about 5,4 GPa, with this condition being maintained for one hour. The graph of FIG. 2 shows the temperature dependence of the Wulff effect on diamond in the same iron-nickel solvent/catalyst at about 5,4 GPa with the condition being maintained for ten hours. From these graphs, it will be noted that the larger the source crystal size the higher the applied temperature to ensure that the Wulff effect dominates and the production of a crystal mass containing a high proportion of single crystals having facets of low Miller index is achieved. Similar graphs can be produced for other solvent/catalysts and applied pressures to determine under what conditions the Wulff effect dominates.

The conditions of elevated temperature and pressure will vary according to the nature of the crystals. For diamond crystals the elevated temperature will generally be in the range 1100 to 1500° C. and the elevated pressure generally in the range 4,5 to 7 GPa.

The bonded, coherent material made by the method of the invention may, for example, be a tool component or insert, bearing surface, substrate for further processing, abrasive material, heat sink biomedical material, catalyst body or the like. These materials all use the properties of the crystal the matrix or a combination of the properties of the crystal and matrix.

The material may have zones of different properties. For example, the zones may vary in crystal concentration or size, or in matrix or in a combination thereof. The differing zones may extend in layers or regions which are distributed in a random or ordered way, for example, from one side of the material to an opposite side or may extend in layers from a central point to an outside surface of the material.

The invention has particular application to materials which have a crystal content of less than 85 percent by volume, generally less than 60% by volume.

The material may be produced in such manner as to provide it with a support layer in the form of a substrate, an external surface layer or an internal core to which it is bonded. The nature of the support layer may be chosen to complement the properties or enhance the utility of the material. The interface between the material and the support layer may be of any shape including planar, convex, concave or irregular.

DESCRIPTION OF EMBODIMENTS

Figure 1:
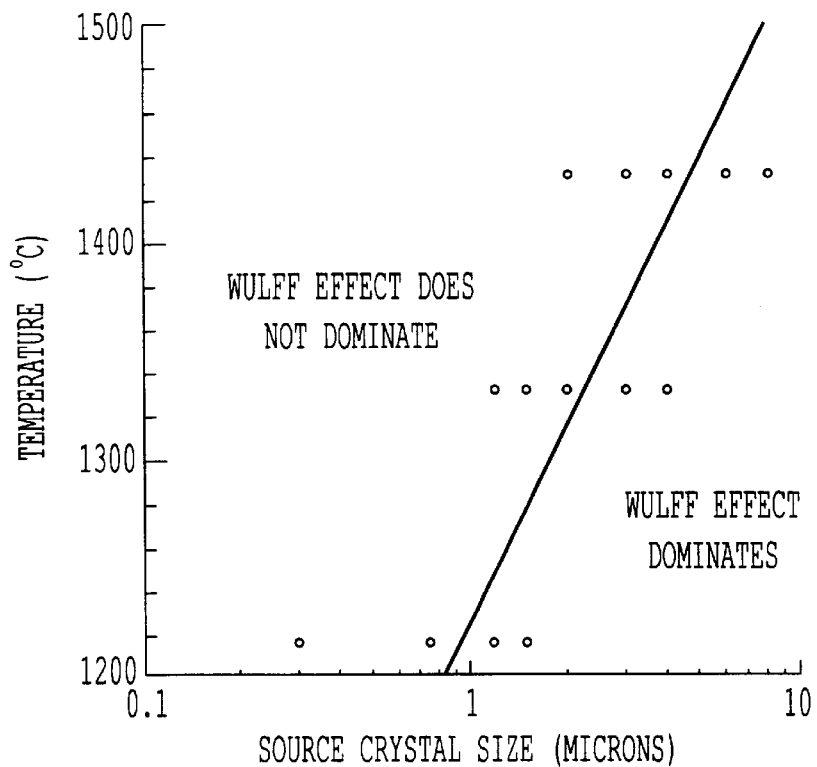
FIG. 1 is a graph showing the temperature dependence of the Wulff effect on diamond in an iron-nickel solvent/catalyst at about 5,4 GPa with the condition being maintained for one hour.
Figure 2:
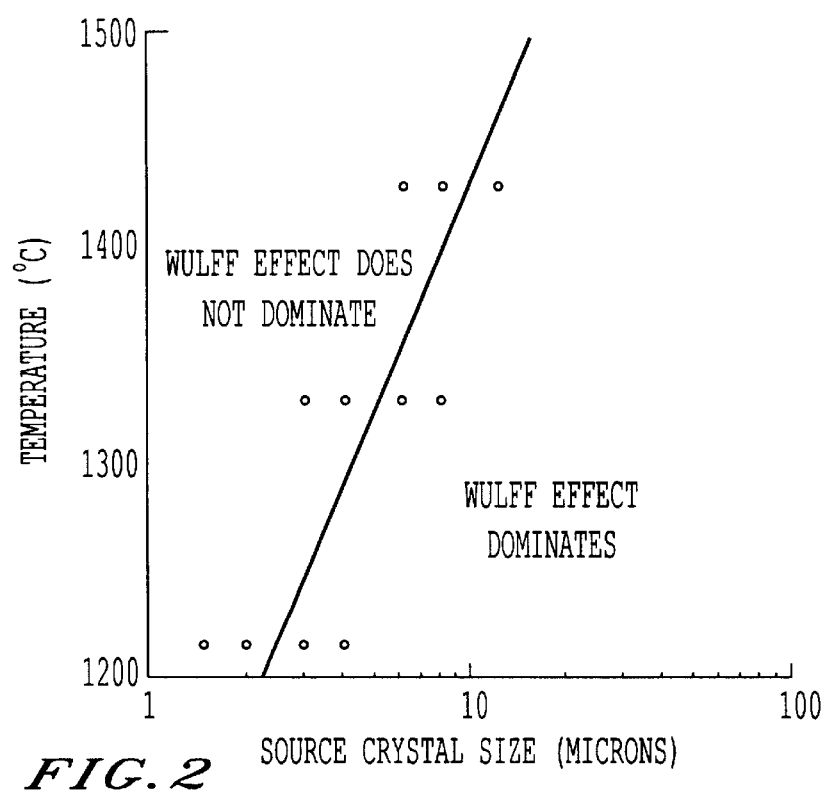
FIG. 2 is a graph showing the temperature dependence of the Wulff effect on diamond in an iron-nickel solvent/catalyst at about 5.4 GPa with the condition being maintained for 10 hours.

The invention allows for the manufacture of a tool component or material by preshaping a mass of source crystals and matrix material and causing crystals to grow and the matrix to form in the same operation. This allows, for example, for the manufacture of a tool component or material to near net shape and dimension for end use. The nature of the matrix and crystal material or a combination thereof determines the service conditions which the tool component or material can endure. The nature of the crystal material, together with the supersaturation-time profile, determines the growth rate and size of the crystals and the relative amounts of the crystal source and metal matrix in the preshaped mass determine the crystal concentration in the tool component or material.

The preshaping or preparation of the crystals and matrix can be done by any conventional method, e.g. hot pressing, cold compaction with and without a temporary binder, or slip casting. However, when the crystals are diamond, the chosen conditions for preshaping should preferably be such that the diamond is not substantially graphitised.

The crystals used and grown in the method of the invention will typically be ultra-hard abrasive particles such as diamond or cubic boron nitride crystals.

The solvent/catalyst which forms at least part of the matrix of the material will depend on the nature of the crystal being grown. Examples of suitable solvent/catalysts for diamond are transition metal elements such as iron, cobalt, nickel, manganese and alloys containing any one of these metals, stainless steels superalloys (e.g. cobalt, nickel and iron-based), silicon steels, cobalt bronzes and brazes such as nickel/phosphorus, nickel/chromium/phosphorus and nickel/palladium. Other suitable solvent/catalysts for diamond are elements, compounds and alloys not containing transition metals, e.g. copper, copper/aluminium and phosphorus, and non-metallic materials or a mixture thereof such as alkaline, alkaline earth metal hydroxides, carbonates, sulphates, chlorates and silicates (such as hydrated forms of forsterite and enstatite).

The source crystals may be provided by particles of irregular shape and substantially free of macroscopically faceted surfaces. An example of suitable source crystals is the product of a crushing operation. The source particles may also be provided by particles which have been treated so that macroscopic facets are damaged or destroyed, and/or surfaces of high Miller index are created, and higher surface energy faces formed thereby.

The source particles may also be provided by particles comprising a core of diamond and a coating of a suitable material such as a layer of a solvent/catalyst, provided, of course, that the diamond particle of the core has high Miller index surfaces and is substantially free of macroscopic facets.

In the case of diamond, the source particles may be synthetic diamond, e.g. produced by conventional high pressure/high temperature processes, or natural diamond.

The conditions of elevated temperature and pressure which are used in the method will also vary according to the nature of the crystal being grown. In the case of diamond and cubic boron nitride growth, the synthesis conditions may be those under which the crystal is thermodynamically stable. These conditions are well known in the art. However, it is also possible to produce diamond growth under conditions which are outside the region of thermodynamic stability of diamond. Conditions of temperature and pressure outside the region of thermodynamic stability of diamond can be used if the Ostwald rule dominates the growth process rather than the Ostwald-Volmer rule (see Bohr, R Haubner and B Lux Diamond and Related Materials volume 4, pages 714–719, 1995)—"According to the Ostwald rule, if energy is withdrawn from a system with several energy states, the system will not reach the stable ground state directly, but instead will gradually pass through all intermediate states. In addition, according to the Ostwald-Volmer rule, the less dense phase is formed (nucleated) first. Where the two rules would appear to contradict each other, the Ostwald-Volmer rule has priority over the Ostwald rule." In the case of diamond crystal growth outside its region of thermodynamic stability, the Ostwald-Volmer rule can be suppressed by, for example, the application of pressure, thus allowing the growth of diamond on pre-existing diamond particles, provided graphite crystals are substantially absent. Although isothermal and isobaric conditions are not essential to the practice of this invention, such conditions are preferred.

The source crystals are brought into contact with a suitable solvent/catalyst to create a reaction mass. Generally, the source crystals will be mixed with the catalyst/solvent in particulate form or as a slurry.

The reaction mass may be placed in the reaction zone of a conventional high temperature/high pressure apparatus and the contents then subjected to the desired elevated conditions of temperature and pressure. The higher Miller index surfaces dissolve in the catalyst/solvent preferentially with respect to the lower Miller index surfaces. The solute migrates to the lower Miller index surface and precipitates or grows thereon. The crystals which are produced will have a morphology which is dependent on the saturation-time profile utilised, apart from the temperature and pressure conditions and chemical composition of the solvent/catalyst which also influences morphology.

The matrix of the crystal-containing material of the invention may contain another phase, or third phase. The other phase should be thermodynamically stable under the conditions of manufacture of the product and may be insoluble, or substantially insoluble, in the solvent/catalyst under these conditions. When the other phase material is soluble, or substantially soluble in the solvent/catalyst, it may be protected by a coating or cladding of lesser solubility.

The other phase and the nature thereof, will depend on the type of product to be produced. The other phase may take the form of particles, fibres, whiskers, platelets or the like. Examples of suitable third phase materials are carbides, oxides, sulphides, nitrides, silicides, borides, elemental materials or a mixture thereof or bonded materials such as cemented carbides.

The other phase may also be or contain a lubricant such as graphite, hexagonal boron nitride or molybdenum disulphide. With the inclusion of such lubricants in the material, the use of external lubricants may be avoided.

The other phase, when in particulate form, may have a particle size which is the same as, or differs from, that of the crystals of the material.

The other phase may contain more than one component, e.g. contain both a carbide and a nitride, or it may include a number of different phases.

The other phase will generally be mixed with the solvent/catalyst and the diamond source and source crystals to produce a reaction mass. The reaction mass is then subjected to the elevated temperature and pressure conditions described above.

The other phase may also be made in situ in the reaction mass during the diamond growth.

The microstructure of the matrix can be manipulated in a number of ways such as by control of the temperature-pressure profile of the cooling stage from the high temperature/pressure step, by subsequent heat treatment or by the inclusion in the reaction mass of materials that act as grain refiners or impart corrosion resistance, such as silicon.

The invention is illustrated by the following non-limiting examples.

EXAMPLE 1

A reaction capsule was used to produce a material comprising diamond crystals dispersed in an iron-cobalt matrix. A mixture was made of (a) 50 g diamond powder and (b) 285 g iron-cobalt catalyst/solvent. The diamond particles were natural diamond, of an irregular, angular shape and without any macroscopic facets, and had a particle size distribution from 20 to 40 microns. The mixture was shaped into a cylinder, containing about 25% porosity, by hot pressing. The cylinder was placed in the reaction capsule and raised to conditions of about 5,5 GPa and about 1380° C. These conditions were maintained for a period of 11 hours. The piece that was removed from the capsule was cylindrical in shape and the dimensions had been reduced in proportion to the reduction in porosity. Inside, the diamond material was substantially the same size as the diamond source material, and had developed macroscopic facets of low Miller index. The material which was bonded and coherent had a strength and abrasion resistance suitable for use in wear resistance and cutting applications.

Figure 4:
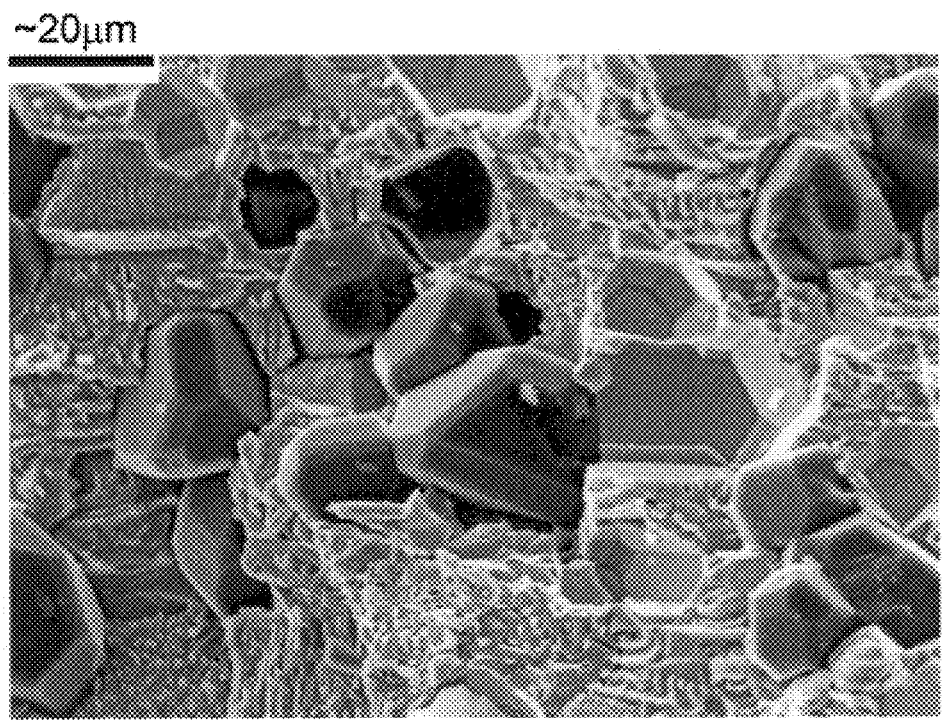
FIG. 4 is a photograph at 875× magnification of a section of a bonded, coherent material of the invention.

The attached FIG. 4 is a photograph at 875× magnification of a section of the material showing the matrix 10 and the diamond 12 having developed macroscopic facets of low Miller index.

EXAMPLE 2

A reaction capsule was used to produce a material comprising diamond crystals dispersed in an iron-nickel matrix. A mixture was made of (a) 30% by volume diamond powder and (b) 70% by volume iron-nickel catalyst/solvent. The particles of the diamond powder were of an irregular, angular shape and without any macroscopic facets, and had a particle size distribution from 8 to 16 microns. The diamond particles were produced by crushing a coarser synthetic material. The mixture was shaped into a cylinder, containing about 25% porosity, by uniaxial cold pressing and sintering at 750° C. The cylinder was placed in the reaction capsule and raised to conditions of about 5,5 GPa and about 1370° C. These conditions were maintained for a period of 1 hour. The piece that was removed from the capsule was cylindrical in shape and the dimensions had been reduced in proportion to the reduction in porosity. Inside, the diamond material was substantially the same size as the diamond source material, and had developed macroscopic facets of low Miller index. The material which was bonded and coherent had a strength and abrasion resistance suitable for use in wear resistance and cutting applications.

EXAMPLE 3

A further reaction capsule was used to produce a material comprising diamond crystals dispersed in an iron-cobalt matrix. A mixture was made of (a) 50 g diamond powder and (b) 285 g iron-cobalt catalyst/solvent. The diamond particles were of an irregular, angular shape and without any macroscopic facets, and had a particle size of about 3 microns. The diamond particles were produced by crushing a coarser synthetic material. The mixture was shaped into a cylinder, containing about 25% porosity, by hot pressing at about 750° C. The cylinder was placed in the reaction capsule and raised to conditions of about 5.6 GPa and about 1350° C. These conditions were maintained for a period of 11 hours. The piece that was removed from the capsule was cylindrical in shape and the dimensions had been reduced in proportion to the reduction in porosity. Inside, the diamond material was substantially the same size as the diamond source material, and had developed macroscopic facets of low Miller index. The material which was bonded and coherent had a strength and abrasion resistance suitable for use in wear resistance and cutting applications.

EXAMPLES 4 to 24

Faceted diamond crystal containing materials were produced using solvent/catalysts other than those identified in Examples 1 to 3. These Examples of other solvent/catalyst systems, and the conditions at which they were used for producing the faceted diamond containing material, are set out in Table I hereinafter. In each of Examples 4 to 24, the source diamond particles were synthetic diamond with an irregular shape produced by crushing coarser material and were free of macroscopic facets.

TABLE I

| Example | Solvent/catalyst or matrix (nominal composition) | Pressure (GPa) | Temperature (° C.) | Time (mins) |
|---|---|---|---|---|
| 4 | 100Fe | 5,25 | 1390 | 660 |
| 5 | 100Co | 5,25 | 1390 | 660 |
| 6 | 100Ni | 5,48 | 1410 | 660 |
| 7 | 100Cu | 5,35 | 1400 | 660 |
| 8 | 100Mn | 5,35 | 1400 | 660 |
| 9 | 89Ni.11P | 5,42 | 1250 | 660 |
| 10 | 52Mn.48Ni | 5,25 | 1360 | 40 |
| 11 | 80Cu.20Ni | 5,3 | 1400 | 300 |
| 12 | 60Cu.40Sn | 5,35 | 1400 | 660 |
| 13 | 60Co.24Cu.16Sn | 5,3 | 1400 | 300 |
| 14 | 42Cu.30Co.28Sn | 5,3 | 1400 | 300 |
| 15 | 54Cu.36Sn.10Co | 5,35 | 1400 | 660 |
| 16 | 77Ni.13Cr.10P | 5,42 | 1410 | 660 |
| 17 | 64Cu.18Ni.18Zn | 5,3 | 1400 | 300 |

TABLE I-continued

| Example | Solvent/catalyst or matrix (nominal composition) | Pressure (GPa) | Temperature (° C.) | Time (mins) |
|---|---|---|---|---|
| 18 | 64Fe.28Ni.8Si | 5,39 | 1370 | 300 |
| 19 | 47Cu.40Zn.13Ni | 5,3 | 1400 | 300 |
| 20 | 30Cu.26Mn.24Ni.20Sn | 5,25 | 1360 | 40 |
| 21 | 45Cu.30Fe.25Co | 5,3 | 1400 | 300 |
| 22 | 55Cu.25Co.20Fe | 5,3 | 1400 | 300 |
| 23 | 49Cu.32Co.15Sn.4Ag | 5,3 | 1400 | 300 |
| 24 | 55Cu.25Co.13Fe.7Ni | 5,3 | 1410 | 300 |

EXAMPLES 25 to 28

The invention is illustrated further by Examples 25 to 28 in which the range of sizes of source diamond particles used in making the faceted diamond containing material are shown. In each example, the pressure was about 5.3 GPa and the conditions were maintained for 11 hours The source diamond in each case was diamond of irregular shape, free of macroscopic facets.

TABLE II

| Example | Diamond particle size (microns) | Source Type | Solvent/catalyst Or matrix | Temperature (° C.) |
|---|---|---|---|---|
| 25 | 1,5 to 3 | Synthetic | Co-Fe | 1390 |
| 26 | 6 to 12 | Synthetic | Co-Fe | 1390 |
| 27 | 53 to 62 | Natural | Fe-Ni | 1400 |
| 28 | 105 to 125 | Natural | Fe-Ni | 1400 |

EXAMPLES 29 to 32

Examples of faceted diamond containing material produced with different diamond concentrations are set out in Table III hereinafter. In each of the examples, the source diamond particles were crushed synthetic diamond of irregular shape, free of macroscopic facets.

TABLE III

| Example | Material diamond Concentration (% by volume) | Solvent/catalyst Or matrix | Pressure GPa | Temperature (° C.) | Time (mins) |
|---|---|---|---|---|---|
| 29 | 8 | Cu-Ni | 5.3 | 1400 | 300 |
| 30 | 25 | Co-Cu-Sn | 5.3 | 1400 | 300 |
| 31 | 49 | Fe-Ni | 5.4 | 1410 | 40 |
| 32 | 78 | Co-Cu-Fe-Ni | 5.3 | 1410 | 300 |

EXAMPLE 33

The control of the particle size distribution of the faceted diamond in the faceted diamond containing material is demonstrated by this example.

The particle size distribution of a mass of source diamond particles free of macroscopic facets and with a nominal size range of 30 microns to 45 microns was measured using a laser beam diffraction method. A mixture was made of (a) 25% by volume of these source diamond particles, and (b) 75% by volume iron-nickel powder. The mixture was placed in a reaction capsule and raised to conditions of about 5,3 GPa and about 1360° C. for a period of 18 minutes.

The diamond was recovered from the material by dissolving the solvent/catalyst in a mixture of dilute mineral acids. After washing and drying, the recovered diamond was weighed and the particle size distribution again measured.

Figure 3:
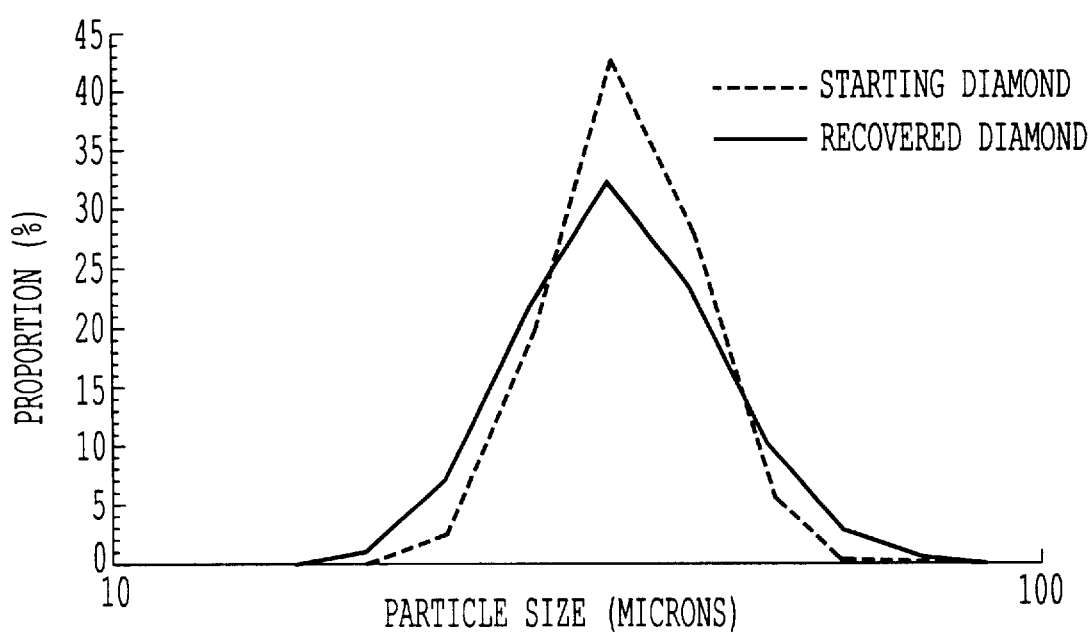
FIG. 3 is a graph comparing the recovered diamond particle size distribution with a starting diamond particle size distribution.

The mass of diamond lost was found to be 24% or 3,5% of the mass of the solvent/catalyst, which is commensurate with the solubility of the diamond in the solvent/catalyst. The particle size distributions of the source diamond particles and the faceted diamond recovered from the reaction capsule are shown in FIG. 3. The size distribution of the source diamond particles and the recovered faceted diamond particles are substantially the same, with the recovered diamonds being slightly larger than the source diamonds, which is also shown by a slight decrease in specific surface area from 0,178 square metres per gram to 0,168 square metres per gram. The slight coarsening of the size distribution is confirmation of the faceting being due to a growth process utilising the Wulff effect rather than a dissolution process.

EXAMPLES 34 to 44

The matrix of the faceted diamond containing material may contain another or third phase. Various third phase materials may be used to produce faceted diamond containing materials of the invention. Examples 34 to 36 are examples of oxide third phases, Examples 37 to 40 are examples of nitride third phases and Examples 41 to 44 are examples of carbide third phases. These oxides, nitrides and carbides remained stable (as confirmed by x-ray diffraction), and were substantially insoluble in the matrix under the processing conditions, except for Example 37. In Example 37, the silicon dioxide was the quartz modification before processing, and was the coesite modification after processing (as confirmed by x-ray diffraction), but the silicon dioxide was nevertheless substantially insoluble in the matrix. In each example, the source diamond particles were crushed synthetic diamond of irregular shape, free of macroscopic facets, and the conditions were about 5,3 GPa and 1410° C. for 300 minutes. The matrix and third phase materials used in each of these examples are set out in Tables IV to VI.

TABLE IV

| Example | 34 | 35 | 36 |
|---|---|---|---|
| Diamond source Size (microns) | 10 to 20 | 4 to 8 | 50 to 100 |
| Third phase oxide | silicon dioxide | CaO stabilised $ZrO_2$ | $Al_2O_3$ |
| Third phase shape | Irregular, angular | Irregular, angular | Tabular |
| Third phase Size (microns) | Less than 45 | 2 to 24 | 6 to 82 |
| Matrix | Co-Fe | Co-Fe | Fe-Ni |

TABLE V

| Example | 37 | 38 | 39 | 40 |
|---|---|---|---|---|
| Diamond source Size(microns) | 10 to 20 | 20 to 30 | 20 to 30 | 10 to 20 |
| Third phase nitride | AlN | TiN | $Si_3N_4$ | Cubic BN |
| Third phase shape | Irregular | Irregular, angular | Irregular | Faceted, octahedral tendency |
| Third Phase size (microns) | Less than 50 | Less than 10 | Less than 10 | 96 to 172 |
| Matrix | Co-Fe | Co-Fe | Fe-Ni | Fe-Ni |

TABLE VI

| Example | 41 | 42 | 43 | 44 |
|---|---|---|---|---|
| Diamond source Size(microns) | 6 to 12 | 20 to 30 | 10 to 20 | 10 to 20 |
| Third phase carbide | $Cr_3C_2$ | Eutectic $W_2C/WC$ | WC | WC-Co (7,4%) |
| Third phase shape | Irregular | Angular | Irregular, angular | Angular |
| Third Phase size (microns) | 3 to 23 | 250 to 420 | 5 to 64 | 74 to 177 |
| Matrix | Co-Fe | Cu-Co-Fe-Ni | Cu-Co-Fe-Ni | Cu-Co-Fe-Ni |

EXAMPLE 45

The third phase may also be made in situ during the high temperature, high pressure process. In another example, a reaction capsule was used to produce a material comprising faceted diamond crystals and chromium carbide particles dispersed in a matrix of nickel/phosphorus containing a small quantity of chromium. The chromium carbide particles were formed by the chemical reaction of chromium metal in the matrix and carbon in solution from the diamond. A mixture was made of (a) 70 volume percent nickel/chromium/phosphorus alloy powder, and (b) 30 volume percent diamond powder. The nickel/chromium/phosphorus alloy powder was substantially spherical, with a particle size range of 6 to 38 microns. The diamond powder, which was irregular in shape, had a particle size range of 15 to 30 microns and had been made by crushing coarser synthetic diamond particles and was free of macroscopic facets. A cylinder was made from the powder mixture by hot pressing, and placed in the reaction capsule. The reaction capsule was raised to conditions of about 5.42 GPa and about 1420° C., and the conditions maintained for 11 hours. The diamond and the third phase were recovered from the material by dissolving the matrix in dilute mineral acid mixture, and removing the solids from the liquor by filtration. Upon examination of the recovered solids, particles of chromium carbide, approximately hexagonal in cross section with a size of about 30 microns across by up to 40 microns long, were found dispersed amongst the faceted diamonds. These diamonds were substantially in the size range of 15 to 30 microns.

EXAMPLE 46

In another example of making a third phase in situ, tungsten carbide was formed in a faceted diamond containing material by the chemical reaction of tungsten with some of the carbon in solution from the diamond. A mixture was made of (a) 71,5 g cobalt-tungsten-iron powder containing 30,6% by mass tungsten, and (b) 28,5 g irregular shaped diamond particles free of macroscopic facets and with a particle size range of 10 to 20 microns. The powder was shaped into a cylinder by hot pressing. The cylinder was placed in a reaction capsule and raised to conditions of about 5,3 GPa and about 1410° C., and the conditions maintained for 11 hours. X-ray diffraction examination of a portion of the material recovered from the reaction capsule showed the presence of tungsten carbide as well as diamond. The diamond was recovered from another portion of the material, and examination of these crystals showed them to be faceted and substantially in the particle size range of 10 to 20 microns.

EXAMPLES 47 to 50

The relative concentrations of the diamond crystals, the matrix and the third phase can be varied independently, with the diamond being the major, minor or intermediate concentration phase. In the examples in Table VII, the source diamond crystals were synthetic diamond particles, irregular in shape and free of macroscopic facets, made by crushing coarser material. In each example, the conditions of pressure and temperature were about 5,3 GPa and about 1410° C.

TABLE VII

| Example | 47 | 48 | 49 | 50 |
|---|---|---|---|---|
| Diamond concentration (% by volume) | 12 | 25 | 35 | 60 |
| Third phase | WC-Co (7,4%) | $SiO_2$ | AlN | WC |
| Third phase concentration (% by volume) | 48 | 25 | 15 | 10 |
| Matrix | Cu-Co-Fe-Ni | Co-Fe | Co-Fe | Fe-Co |
| Matrix concentration (% by volume) | 40 | 50 | 50 | 30 |
| Time (mins) | 300 | 300 | 300 | 660 |

EXAMPLES 51 to 53

The relative sizes of the diamond crystals and the third phase can be varied independently, with the diamond being the larger, smaller or about the same size as the third phase. In the examples of Table VIII, the source diamond crystals were from a synthetic diamond source and were irregular in shape and free of macroscopic facets. In each example, the conditions of pressure and temperature were about 5.3 GPa and about 1410° C.

TABLE VIII

| Example | 51 | 52 | 53 |
|---|---|---|---|
| Source diamond size range (microns) | 20 to 30 | 6 to 12 | 10 to 20 |
| Third phase | WC | $Cr_3C_2$ | Cubic BN |
| Third phase particle size range (microns) | About 0,05 | 3 to 20 | 88 to 105 |
| Matrix | Co-Fe | Co-Fe | Fe-Ni |
| Time (mins) | 660 | 300 | 300 |

In Examples 1 to 5, 9, 25, 26, 30, 31 and 33 at least 80% of the diamond crystals in the material had developed macrofacets of low Miller Index. In the remaining Examples at least 50% of the diamond crystals in the material had developed macrofacets of low Miller Index.

What is claimed is:

1. A method of making a bonded, coherent material comprising a mass of diamond crystals in a matrix, said method comprising providing source diamond crystals substantially free of macroscopically faceted surfaces, producing a reaction mass by bringing the source diamond crystals into contact with a suitable solvent/catalyst, subjecting the reaction mass to conditions of elevated temperature and pressure suitable for crystal growth in the reaction zone of a high temperature/high pressure apparatus to produce the material, and removing the material from the reaction zone, wherein under the conditions of crystal growth the source diamond crystals are converted to diamond crystals having macroscopic facets of low Miller index, wherein a supersaturation driving force necessary for crystal growth is generated predominantly by the difference in surface free energy between low Miller index surfaces and high Miller index surfaces of the source diamond crystals, and wherein the diamond crystals are single crystals, wherein the diamond content in the material is less than 85% by volume.

2. The method according to claim 1, wherein at least 50% of the diamonds in the material have developed macroscopic facets of low Miller index.

3. The method according to claim 1, wherein at least 70% of the diamonds in the material have developed macroscopic facets of low Miller index.

4. A method according to claim 1 wherein the elevated temperature is in the range 1100 to 1500° C. and the elevated pressure is in the range 4,5 to 7 GPa.

5. The method according to claim 1, wherein the diamond content of the material is less than 60% by volume.

6. The method according to claim 1, wherein the source diamonds and the solvent/catalyst are mixed to produce a reaction mass.

7. The method according to claim 1, wherein the matrix contains another phase.

8. The method according to claim 7, wherein the other phase is in the form of particles, fibers, whiskers or platelets.

9. The method according to claim 7, wherein the other phase is a carbide, oxide, nitride, silicide, boride or a mixture thereof.

10. The method according to claim 7, wherein the other phase is mixed with the source diamonds and the solvent/catalyst to create the reaction mass.

11. The method according to claim 7, wherein the other phase is produced in situ in the reaction mass during the diamond growth.

12. The method according to claim 1, wherein the solvent/catalyst is a transition metal.

13. The method of claim 12, wherein the transition metal is selected from the group consisting of iron, cobalt, nickel, manganese and alloys thereof.

14. The method of claim 1, wherein the solvent/catalyst is a stainless steel super alloy, a silicon steel, a cobalt bronze or a cobalt braze.

15. The method of claim 1, wherein the solvent/catalyst does not contain a transition metal.

16. The method of claim 1, wherein the source diamonds are the product of a crushing operation.

17. The method of claim 1, wherein the source diamonds are natural diamonds with a particle size distribution from 20–40 microns, the elevated temperature is 1,380° C. and the elevated pressure is 5.5 GPa, and the conditions of elevated temperature and pressure is maintained for a period of 11 hours.

* * * * *

Disclaimer 6,576,211—Geoffrey John Davies, Randburg (ZA); Raymond Albert Chapman, Johannesburg (ZA); Aulette Stewart, Randburg (ZA); Lesley Kay Hedges, Brackenhurst (ZA); Moosa Mahomed Adia, Benoni (ZA). CRYSTAL-CONTAINING MATERIAL. Patent dated June 10, 2003. Disclaimer filed February 19, 2004, by applicant, Moosa Mahomed ADIA.

The term of this patent shall not extend beyond the expiration date of Pat. No. 6,576,211.

*(Official Gazette, June 15, 2004)*